E. J. GRETENCORD.
SHELLER DRAG.
APPLICATION FILED NOV. 21, 1918.
1,338,727.
Patented May 4, 1920.
4 SHEETS—SHEET 4.
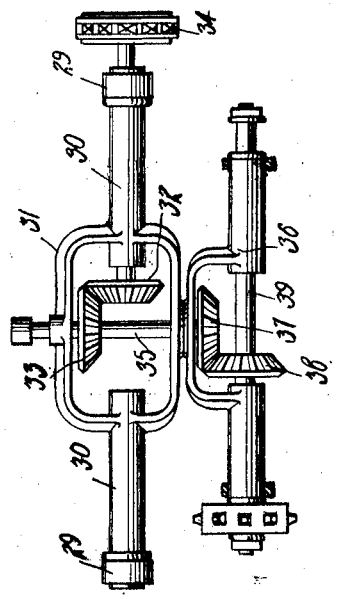
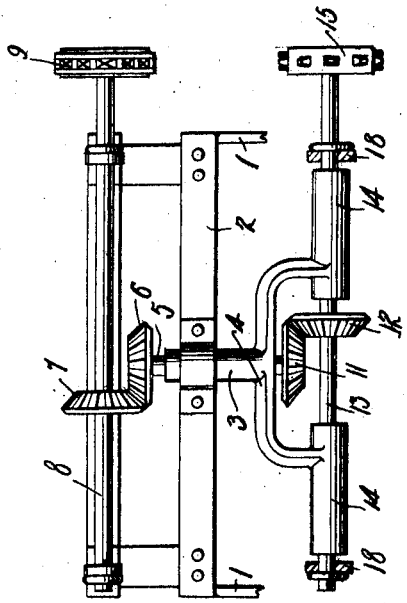
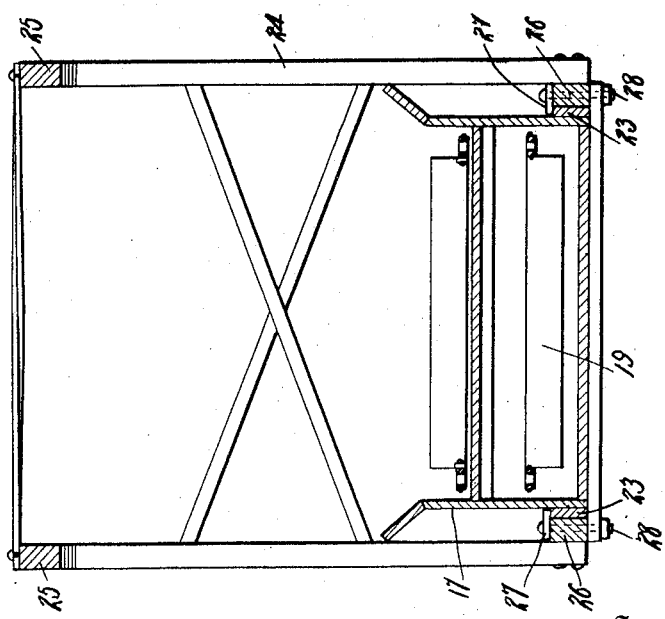
Witnesses
W. C. Fielding.
Inventor
Edward J. Gretencord
By Richard B. Owen.
Attorney

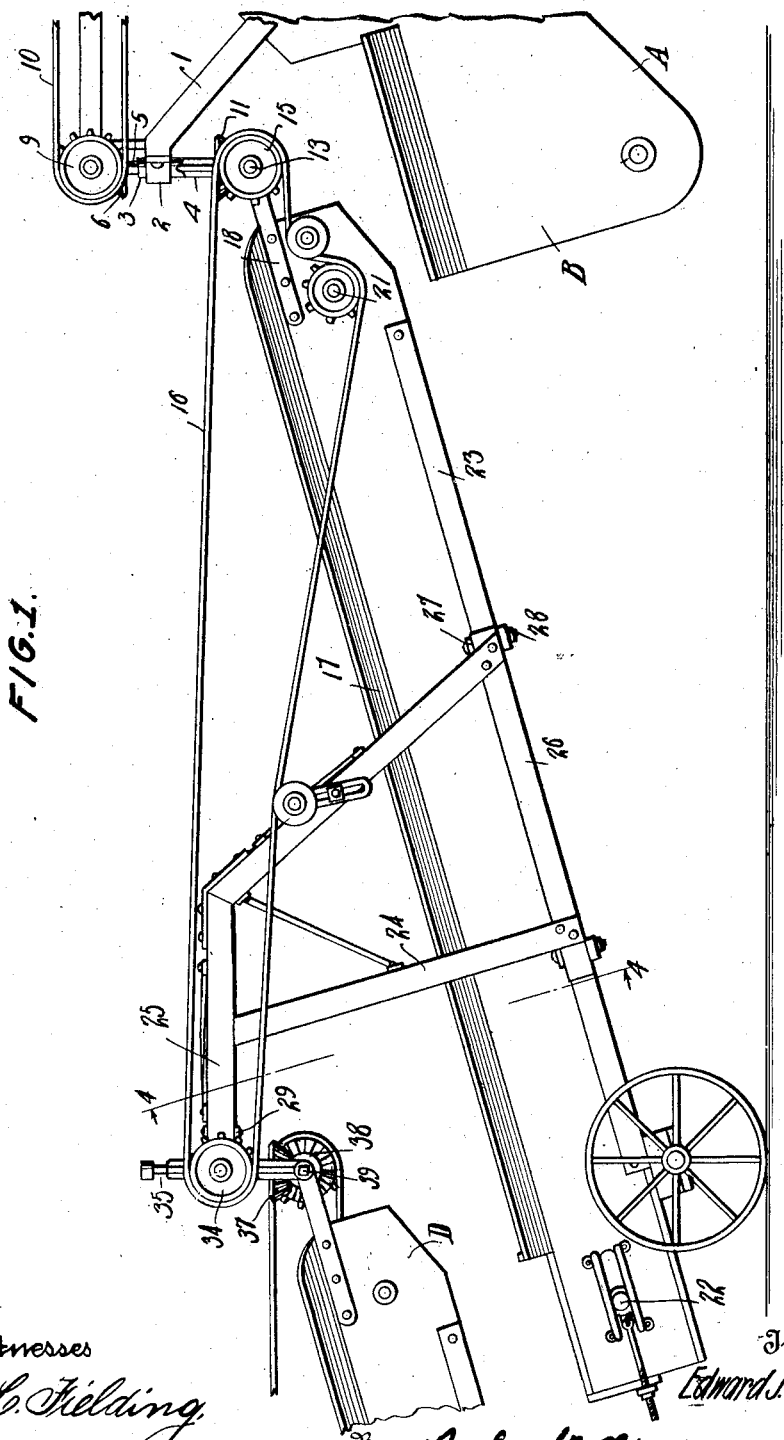

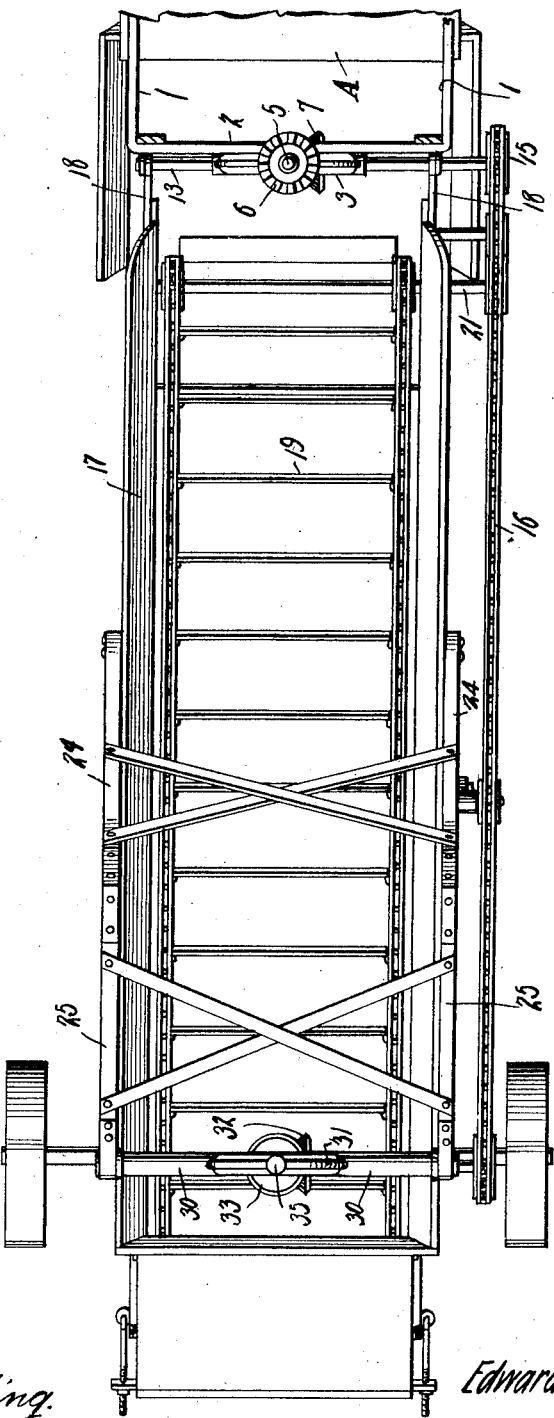

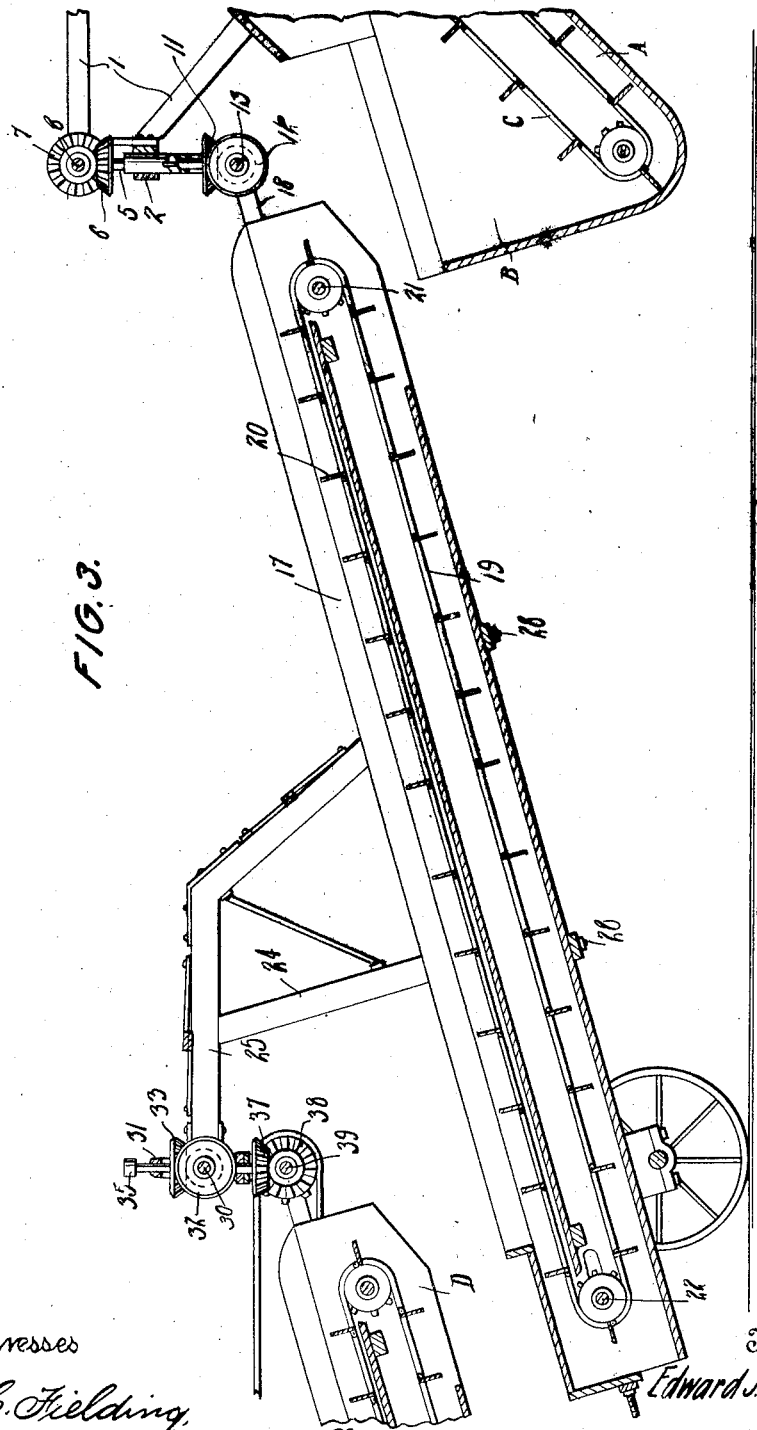

# UNITED STATES PATENT OFFICE.

EDWARD J. GRETENCORD, OF OTTAWA, ILLINOIS.

SHELLER-DRAG.

1,338,727.

Specification of Letters Patent.   Patented May 4, 1920.

Application filed November 21, 1918. Serial No. 263,556.

*To all whom it may concern:*

Be it known that I, EDWARD J. GRETENCORD, a citizen of the United States, residing at Ottawa, in the county of La Salle and State of Illinois, have invented certain new and useful Improvements in Sheller-Drags, of which the following is a specification.

This invention relates to corn sheller drags and more particularly to an improved device adapted for use with a corn sheller and so arranged as to permit the corn to be conveyed from the corn crib to the corn sheller regardless of the relative positions of the crib and sheller.

One of the primary objects of the invention is to interpose a portable conveyer between the corn sheller and the drag which receives the corn from the corn crib, the sheller, conveyer and drag being so connected as to permit the drag to have its relative position changed so that it may be moved from one side of the crib to the other without requiring a change in the position of the sheller.

The invention further aims to provide a device of this character that will permit attachment to the type of drag shown as "built in drag" which are often associated with corn cribs and are difficult to connect to the ordinary sheller.

Another object is to provide a conveyer adapted to be swingingly connected to the sheller and also provided with a longitudinally movable supporting bracket from which the drag may be suspended so that all of the connected elements in the device may be angularly adjusted with respect to each other and so that the drag and conveyer may also be relatively adjusted longitudinally with respect to each other whereby the apparatus may be conveniently located when the shelling operation is to begin.

A further object of the invention is to provide a device of this character which consists of comparatively few parts and is simple in construction but durable and well adapted to withstand the rough usage to which devices of this character are ordinarily subjected.

For a full description of the invention and the advantages and merits thereof reference is to be had to the following description and accompanying drawings, in which:—

Figure 1 is a side elevation of the apparatus constructed in accordance with my invention.

Fig. 2 is a plan view of the same.

Fig. 3 is a longitudinal section.

Fig. 4 is a section taken on the line 4—4 of Fig. 1.

Fig. 5 is a detail view of a portion of the apparatus showing the structure from which the drag is suspended at one end.

Fig. 6 is a detail view of the forward portion of the apparatus showing the structure from which the forward end of the conveyer is suspended at the rear end of the sheller.

Referring to the drawings wherein is illustrated the preferred form of my invention, in which like characters of reference indicate like or corresponding parts throughout the several views, the corn sheller, a part of which is indicated at A is provided with a receiving hopper B through which the conveyer C travels so that when the corn is dropped into the hopper the conveyer carries the same to the shelling apparatus in the sheller. Above the rear of the hopper B is a supporting frame 1 which includes a transverse bar 2 having a centrally located bearing 3 attached thereto. This bearing includes the vertical sleeve portion 4 through which a shaft 5 is extended, the upper end of the same being provided with a beveled gear 6 in mesh with a beveled gear 7 on a transverse shaft 8 which is supported by the frame 1 and has one end provided with a sprocket 9 over which a driving chain 10 is trained. The lower end of the shaft 5 also carries a beveled gear 11 in mesh with a beveled gear 12 on a shaft 13 which is disposed directly beneath the shaft 8 as shown to advantage in Fig. 3 of the drawing, this shaft being supported by sleeve portions 14 included in the bracket 3. The end of the shaft 13 is also provided with an extension which carries a sprocket 15 adapted to receive the chain 16. This chain 16, therefore is driven from the sprocket 15, the latter being driven by the chain 10 through the medium of the above described gearing. Inasmuch as the sleeve portion 4 of the bracket 3 is centrally mounted in the transverse bar 2 it will be apparent that the bracket may readily turn to be swung to any position for changing the relative position of the shaft 13 with respect to the end of the sheller above the hopper B. The upper forward end of the conveyer 17, therefore, is attached to this shaft 13 through the medium of arms 18 fastened to the side rails of the conveyer 17. Within the conveyer is the usual movable platform 19 having the cleats 20 carried thereby the platform being trained over rollers supported on shafts 21 and 22 at the ends of the conveyer. These shafts have their ends extending beyond the side rails of the conveyer and the shaft at the upper forward end is provided with a sprocket over which the chain 16 is trained as shown to advantage in Figs. 1 and 2 of the drawing. In this manner the movable platform 19 is driven by the sheller mechanism.

The opposite end of the conveyer 17 is supported on wheels whereby it may be readily transported, and as shown to advantage in Figs. 1 and 4, the side rails of the conveyer are provided with longitudinal strips 23. A longitudinally movable supporting bracket is mounted on these strips 23 and this bracket includes the upwardly extending standards 24 which support suspension arms 25 at their upper ends. The lower ends of the standards 24 are connected on their inner sides by the parallel stringers 26 which engage the strips 23, and the stringers carry plates 27 rigidly fixed thereto and adapted to overlap and engage the strips 23 so that the plates support the stringers which maintain the bracket in position on the conveyer. A removable bolt or fastening element 28 holds the plate 27 in position at each side and it will be obvious that when these bolts 28 are removed, the bracket may be adjusted longitudinally on the strips 23 when desired.

The suspension bars 25 support a gear mechanism shown more clearly in Figs. 3 and 5 of the drawings. Bearings 29 carried by the ends of the suspension bars 25 support the sleeve portion 30 of a bracket member 31 which has its central portion made in the form of a yoke embracing the gears 32 and 33. The gear 32 is mounted on the end of a shaft extending through the sleeve portion 30 at one side of the bracket and the opposite end of the shaft is provided with a sprocket 34 which receives the chain 16 so that this shaft is driven. The gear 33 meshes with the gear 32 and is mounted upon a vertical shaft 35 which extends vertically through the yoke and supports a swingingly mounted bracket 36 beneath the yoke in the bracket 31. The lower end of the shaft 35 is provided with another beveled gear 37 in mesh with a beveled gear 38 on the shaft 39 which is supported by the swinging bracket 36. This bracket 36 is adapted to swing in the same manner as the bracket 3 at the opposite end of the conveyer and receives one end of the drag D which is arranged in the usual manner adjacent the corn crib for receiving the corn therefrom to convey it to the conveyer. A portion of the corn drag is shown in Figs. 1 and 3 of the drawing and it will be noted that the end thereof is above the rear lower end of the portable conveyer. When the parts are assembled in the above described manner it will be obvious that the portable conveyer which is interposed between the corn sheller and the corn drag D may be swung on the swinging support carried by the sheller so that the relative angular positions of the sheller and conveyer 17 will be changed and the corn drag D may then be moved to another crib or at the opposite side of the same crib so that the position of the sheller need not be changed while the corn is being taken from another portion of the crib. The device may just as readily be used with a "built in" type of corn drag which is usually mounted on the corn crib and have an elevated end. In this instance the conveyer 17 will be placed beneath the elevated end so that the corn will be received on the movable platform and transported to the sheller.

The time saved in changing the position of the mechanism with the use of this device is considerable and the necessity of maneuvering with the cumbersome sheller in close quarters is avoided.

The foregoing description and accompanying drawings have reference to what might be considered to be the preferred or approved form of my invention. I desire it to be understood that I may make such changes in the construction, combination and arrangement of parts, materials, dimensions, et cetera, as may prove expedient and fall within the scope of the appended claims.

Having thus fully described my invention, what I claim as new and desire to secure by Letters Patent, is:—

1. An attachment of the character described comprising in combination a supporting bracket having one end adapted for pivotal connection to the discharge end of a shelter drag and an inclined base at the other end, a conveyer carrier slidably mounted in said bracket and adjustable along the inclined base thereof with its elevated end adapted for pivotal connection with the receiving end of a corn sheller and its lower end slidable beneath the discharge end of the sheller drag, and means associated with said attachment whereby motion may be transmitted to the conveyer element thereof.

2. An attachment of the character described including the combination with a conveyer carrier having longitudinally ribbed sides, of a suspension bracket adjustably associated with said carrier, said bracket comprising side standards extending upwardly from opposite sides of the carrier, stringers carried by said standards for engaging the ribs of the said ribbed carrier sides, base strips straddling the bottoms of said carrier and connecting the said standards at their lower ends, clamping plates carried by the said stringers to overlap the said ribs of the carrier sides, means for releasably clamping said plates and base strips respectively against the ribs of the carrier sides and the bottom of the carrier for maintaining said carrier immovable upon the bracket, and suspension arms supported at the upper connected ends of said side standards at an angle to the said base strips whereby said carrier may be suspended from a sheller drag with one end elevated for connection to the receiving end of a corn sheller and with the other end lowered for appropriate engagement with the discharge end of a sheller drag.

3. The combination with a corn sheller having a supporting bracket above the rear end thereof, and a sheller drag at the rear end of the corn sheller but in spaced relation thereto, of a portable conveyer interposed between the rear of the sheller and the discharge end of said drag, a supporting bracket pivotally supported from the discharge end of said sheller drag and projecting into the space between the drag and sheller for embracing and supporting said portable conveyer, and having an inclined base upon which said conveyer rests, means for pivotally connecting the elevated end of said conveyer to the rear supporting bracket of the said sheller whereby said conveyer may be moved longitudinally of the inclined supporting base upon which it rests by the controlling movement of the sheller, and means for supporting the low end of the conveyer beneath the discharge end of the sheller drag when said conveyer is swung with said bracket to one side of said drag, so that its angular position with respect to the drag is thereby changed.

In testimony whereof I affix my signature in presence of two witnesses.

EDWARD J. GRETENCORD.

Witnesses:
 HENRY L. ARNOLD,
 NELLIE ERICKSON.